United States Patent [19]

DeWoskin

[11] 4,117,180

[45] Sep. 26, 1978

[54] DRAPERY PLEATING TAPE AND ITS MANUFACTURE

[75] Inventor: Kenneth J. DeWoskin, Ann Arbor, Mich.

[73] Assignee: Beltx Corporation, Barnhart, Mo.

[21] Appl. No.: 781,184

[22] Filed: Mar. 25, 1977

[51] Int. Cl.² .......................... B32B 7/04; B32B 3/00
[52] U.S. Cl. ..................................... 428/35; 156/73.1;
156/290; 160/348; 428/195; 428/474; 428/480
[58] Field of Search ............... 428/121, 122, 181, 195,
428/35, 474, 480; 160/330, 348, 390, 391;
156/73.1, 272, 273, 290

[56] References Cited

U.S. PATENT DOCUMENTS

| 2,710,653 | 6/1955 | Solomon | 160/348 |
| 2,985,235 | 5/1961 | Landell | 160/348 |
| 3,733,238 | 5/1973 | Long et al. | 156/73.1 |
| 3,993,532 | 11/1976 | McDonald et al. | 156/73.1 |

Primary Examiner—George F. Lesmes
Assistant Examiner—P. Thibodeau
Attorney, Agent, or Firm—Koenig, Senniger, Powers and Leavitt

[57] ABSTRACT

A drapery pleating tape comprising two layers of flexible ultrasonically sealable fabric (which may be nonwoven or woven fabric) having ultrasonically sealed transverse lines of seals providing pockets for receiving pins of drapery hooks, ultrasonically sealed transverse lines of seal midway between the pockets, all these transverse lines of seal constituting fold lines on which the tape is foldable for pleating it, and ultrasonically sealed longitudinally extending lines of seal for stiffening the sections of the tape between the pockets and said midway lines of seal.

2 Claims, 12 Drawing Figures

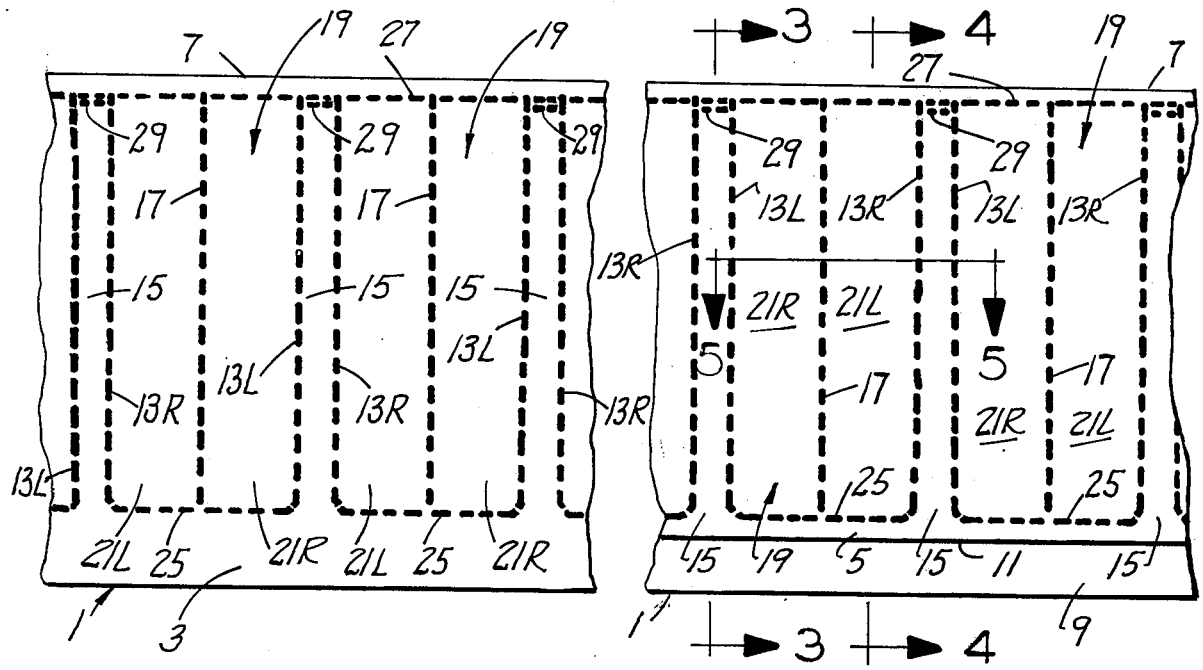
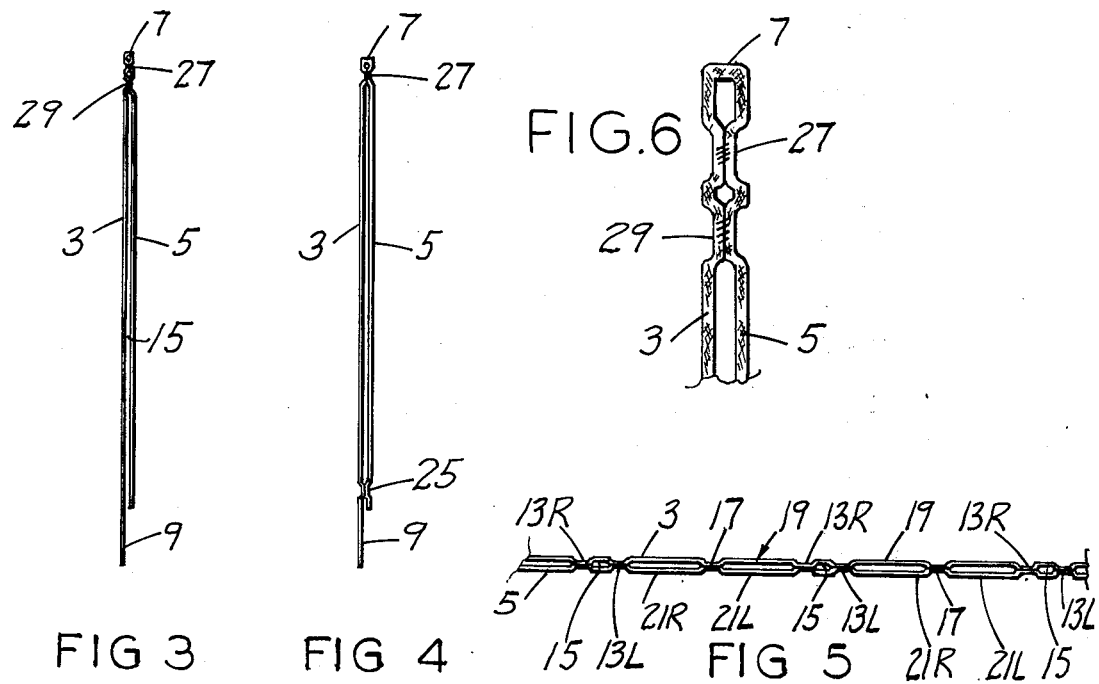

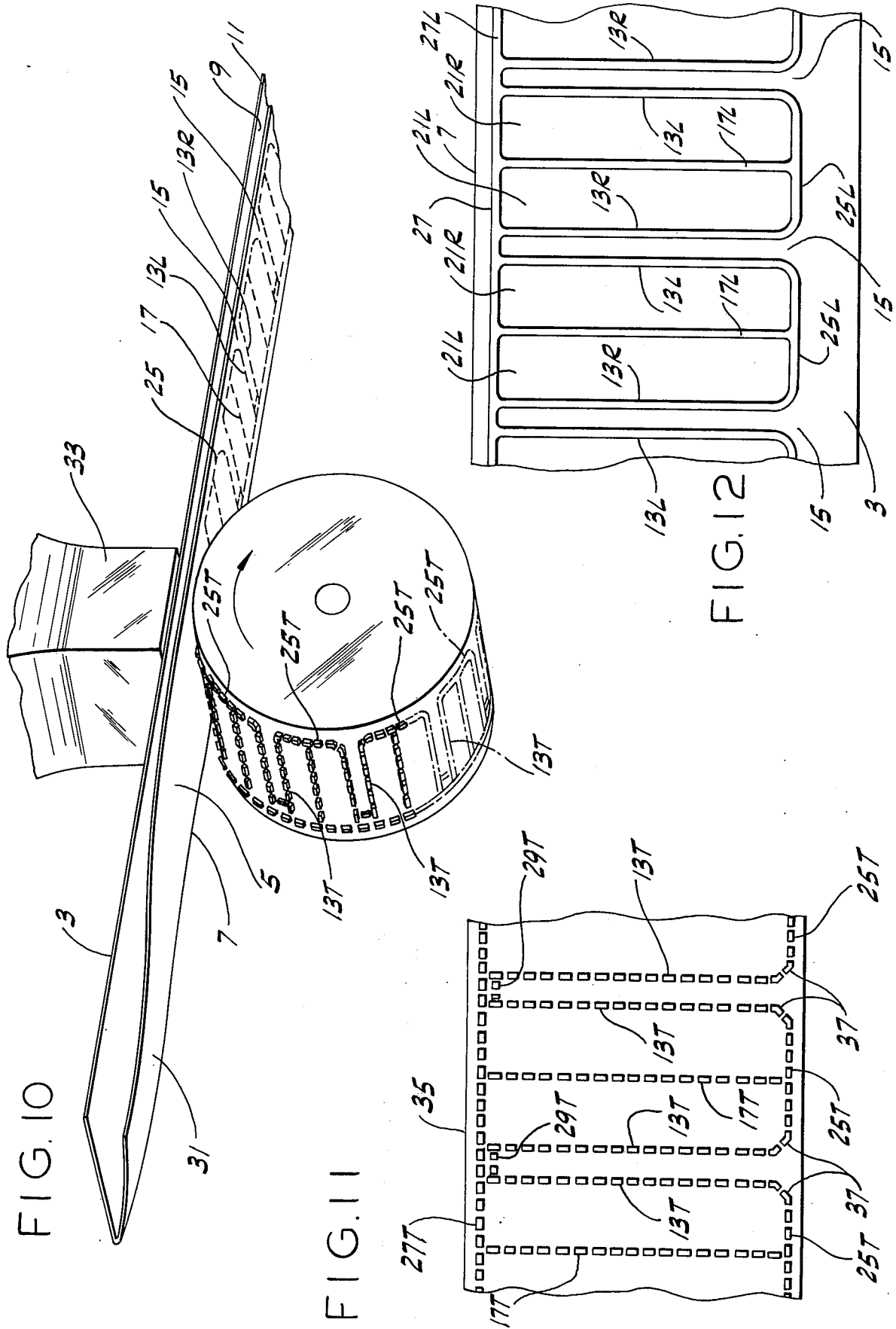

4,117,180

DRAPERY PLEATING TAPE AND ITS MANUFACTURE

BACKGROUND OF THE INVENTION

This invention relates to drapery pleating tape and a method of manufacturing such tape.

The invention is in the same general field as the inventions disclosed in the following U.S. Pat. Nos.: 2,985,235; 3,132,686; 3,660,186; 3,677,861; 3,884,738.

SUMMARY OF THE INVENTION

Among the several objects of the invention may be noted the provision of an improved drapery pleating tape which, while enabling formation of sharply and evenly folded pleats in the tape and hence in a drape to which the tape is applied, is economical to manufacture and easy to use; and the provision of a method of economically manufacturing such tape.

In general, drapery pleating tape of this invention comprises two layers of thermoplastic fabric joined along one longitudinal edge of the tape. These layers are thermoplastically sealed together at intervals spaced longitudinally of the tape on pairs of lines of seal extending transversely of the tape. The two lines of seal of each said pair are spaced one from the other longitudinally of the tape but being relatively closed adjacent one another thereby to define therebetween a relatively narrow elongate pocket closed at its end at said one longitudinal edge of the tape and open at its other end adjacent the other longitudinal edge of the tape for reception of a pin of a drapery hook. One of said lines of seal of each pair constitutes a left side seal and the other a right side seal for the respective pocket. The layers are also thermoplastically sealed together at intervals spaced longitudinally of the tape on lines of seal extending transversely of the tape in each section of the tape intermediate successive pockets, each of said intermediate lines of seal dividing the respective section of the tape into two panels. The left and right side pocket seals and the intermediate seals form lines of fold for pleating the tape with the said two panels of each said section of the tape forming a pleat. The layers are further thermoplastically sealed together on lines of seal extending within each of said panels from side-to-side of each panel for stiffening each panel. In accordance with the method of this invention, the tape is made by feeding forward two layers of ultrasonically sealable fabric one on the other and ultrasonically sealing them as above prescribed as they are fed forward.

Other objects and features will be in part apparent and in part pointed out hereinafter.

BRIEF DESCRIPTION OF THE DRAWINGS

FIG. 1 is a view in elevation of one face of a drapery pleating tape made in accordance with this invention;

FIG. 2 is a view in elevation of the other face of the FIG. 1 tape;

FIGS. 3–5 are enlarged transverse sections on lines 3—3, 4—4, and 5—5 respectively, of FIG. 1;

FIG. 6 is an enlarged fragment of FIG. 3;

FIG. 10 is a perspective showing how the tape is made;

FIG. 11 is a developed view of a wheel of FIG. 10; and

FIG. 12 is a view similar to FIG. 1 showing a modification.

Corresponding reference characters indicate corresponding parts throughout the several views of the drawings.

DESCRIPTION OF THE PREFERRED EMBODIMENTS

Figure 7:
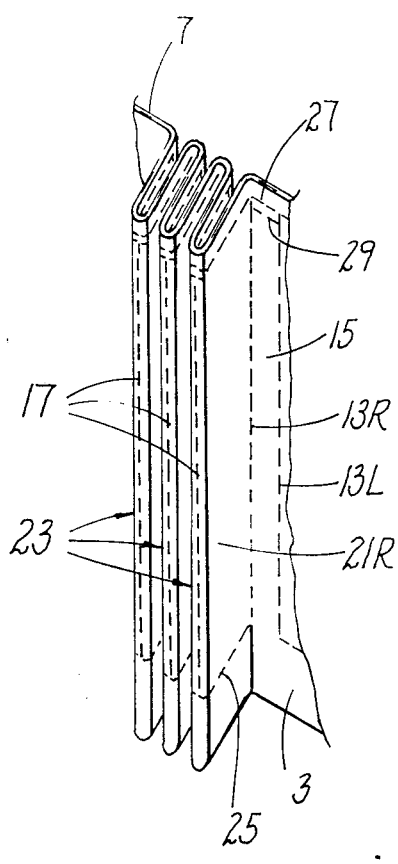
FIGS. 7 and 8 are perspectives of the pleated portion of the tape as viewed from the front and the back, respectively, with the pleats shown spread open in order to show detail.

Referring to the drawings, a drapery pleating tape of this invention, designated 1 in its entirety, is shown to comprise two layers 3 and 5 of flexible thermoplastic fabric and more particularly an ultrasonically sealable fabric such as a woven or nonwoven polyester fabric. Thus, for example, the tape may consist of a nonwoven polyester fabric such as that sold under the trade name REEMA by E. I. duPont de Nemours and Co., or a woven polyester fabric, or woven or nonwoven nylon fabric. The layer 3, which is the front layer of the tape as it is applied to a drape, is wider than the layer 5. The two layers are joined along one longitudinal edge thereof as indicated at 7, this being the upper edge of the tape as it is applied to a drape, the wider layer 3 having a longitudinal marginal portion 9 at its other edge, which is its lower edge, extending out laterally (downwardly) beyond the other edge 11 of the narrower layer 5. Preferably the tape is constituted of a single length or strip of the fabric, which is folded along a longitudinal fold line at 7 offset laterally from the longitudinal center line of the strip so as to provide the wide layer 3 and the narrow layer 5 integrally joined along the longitudinal edge of the tape at the integral fold 7 of the tape. It is contemplated, however, that the layers 3 and 5 may be constituted as separate strips of fabric.

The layers 3 and 5 are thermoplastically sealed and more particularly ultrasonically sealed together at intervals spaced longitudinally of the tape on pairs of lines of seal extending transversely of the tape. The two lines of each pair, which are designated 13L and 13R, are spaced from one another longitudinally of the tape but are relatively closely adjacent one another thereby to define therebetween a relatively narrow elongate pocket, designated 15, open at its end at the edge 11 of the narrower layer 5 and closed at its other end for reception of a pin of a drapery hook. Line of seal 13L of each pair constitutes a left side seal for the respective pocket and line of seal 13R constitutes a right side seal for the respective pocket (left and right being as viewed in FIG. 1 from the front of the tape).

The layers 3 and 5 are also thermoplastically sealed and more particularly ultrasonically sealed together at intervals spaced longitudinally of the tape on lines of seal 17 extending transversely of the tape in each section 19 of the tape intermediate successive pockets 15. As illustrated, each line of seal 17 is midway between the right side seal 13R of the pocket 15 at the left of section 19 and the left side seal 13L of the pocket 15 at the right of section 19. It divides section 19 into two side-by-side panels, the left-hand panel of the two being designated 21L and the right-hand panel of the two being designated 21R. The left and right pocket side seals 13L and 13R and the intermediate seals 17 form lines of fold for these panels for pleating the tape with the two panels 21L and 21R of each section 19 between two successive pockets 15 folded on the respective line 17 to form a pleat such as indicated at 23 in FIGS. 7–9.

The layers 3 and 5 are further thermoplastically sealed and more particularly ultrasonically sealed together on lines of seal extending longitudinally of the tape between the right side seal 13R and the left side seal of 13L of successive pockets 15 for stiffening the panels 21L and 21R. In this respect, the layers 3 and 5 are sealed together on lines of seal 25 extending longitudinally of the tape in each of sections 19 of the tape adjacent the edge 11 of the narrower layer 5 between the right side seal 13R of the pocket 15 at the left of the section 19 and the left side seal 13L of the pocket 15 at the right of the section 9. Lines 25 are co-linear, in effect being an interrupted line of seal, the interruptions therein being at the pockets 15. Also, the layers 3 and 5 are thermoplastically sealed and more particularly ultrasonically sealed together on a continuous line of seal 27 extending longitudinally of the tape adjacent the longitudinal edge of the tape at fold 7. As appears in FIGS. 1 and 2, the line of seal 27, being continuous, has portions extending between the right side seal of the pocket at the left of each section and the left side seal of the pocket at the right of each section, and portions between the left and right side seals of the pockets forming ends for the pockets.

The layers 3 and 5 are further thermoplastically sealed and more particularly ultrasonically sealed together on relatively short lines of seal 29 extending longitudinally of the tape between the left and right side seals 13L and 13R of each pocket 15 adjacent and inward of (below) the continuous line of seal 27. Each pocket is thus closed at its upper end by the fold at 7, a portion of the continuous line of seal 27 extending between the pocket side seals, and the respective short seal 29, the latter reinforcing the pocket at its closed upper end. The lines of seal 17 extend from line 25 to line 27. Lines 25 and 27 form stiffening means for the panels 21L, 21R.

As shown in FIG. 10, the tape as above described is made in accordance with this invention by feeding forward a continuous strip 31 of ultrasonically sealable fabric (e.g., woven or nonwoven polyester fabric) from which the tape is to be made with the strip folded on the fold line at 7 to provide the layers 3 and 5 between the horn 33 and anvil 35 of an ultrasonic sewing machine of a type such as shown in U.S. Pat. No. 3,666,599 and sold by Branson Sonic Power Company of Danbury, Conn. The anvil is in the form of a wheel (like the wheel indicated at 24 in U.S. Pat. No. 3,666,599 with a pattern of lines of teeth on its periphery for forming the lines of seal 13L, 13R, 25, 27 and 29 each as a series of discrete fused stitches. Thus the pattern comprises a series of pairs of lines of teeth 13T and lines of teeth 17T intermediate the pairs extending axially on the cylindrical surface of the wheel spaced at intervals around the wheel corresponding to the desired spacing of the pockets 15 and lines 17 for forming the lines of seal 13L and 13R and 17 each as a series of discrete fused stitches. It further comprises a series of lines of teeth 25T extending circumferentially of the wheel adjacent one end of the wheel, for forming the lines of seal 25 each as a series of discrete fused stitches, each line in this series extending from a line 13T of a pair to the line 13T of the next successive pair. The junctions of lines 25 with lines 13T may be curved as indicated at 37 so that each pocket has a flaring mouth. The pattern further comprises a continuous line of teeth 27T extending annularly all around the wheel adjacent the other end of the wheel for forming the continuous longitudinal line of seal 27 as a series of discrete fused stitches. Finally, the pattern comprises short lines of teeth 29T extending between lines adjacent and inward of line 27T for forming the short lines of seal 29 each as a series of discrete fused stitches. As the folded strip 31 passes between the horn 33 and the anvil 35, with the horn ultrasonically powered, the layers 3 and 5 are ultrasonically sealed by lines of teeth 13T to form the pocket side seals 13L and 13R, by the lines of teeth 17T to form the intermediate seals 17, by the lines of teeth 25T to form the lines of seal 25, by the line of teeth 27T to form the continuous longitudinal line of seal 27, and by the lines of teeth 29T to form the short lines of seal 29.

Figure 8:
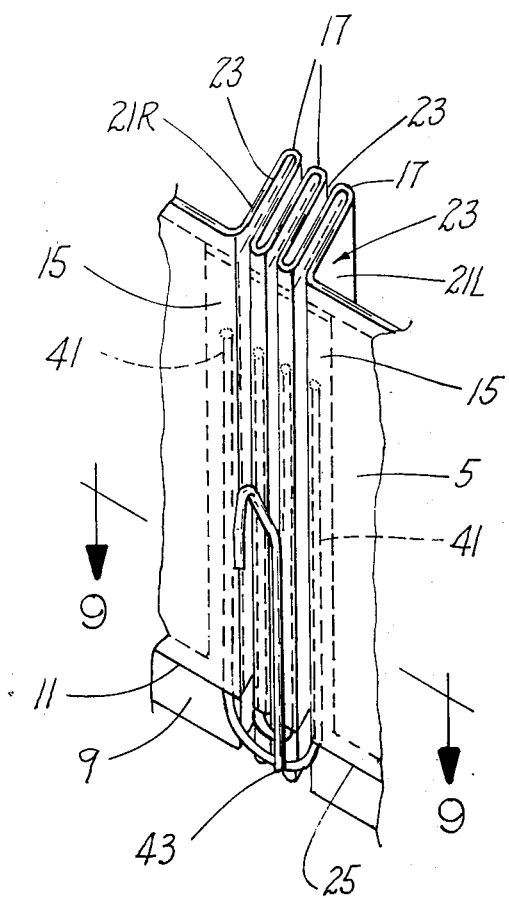
Figure 9:
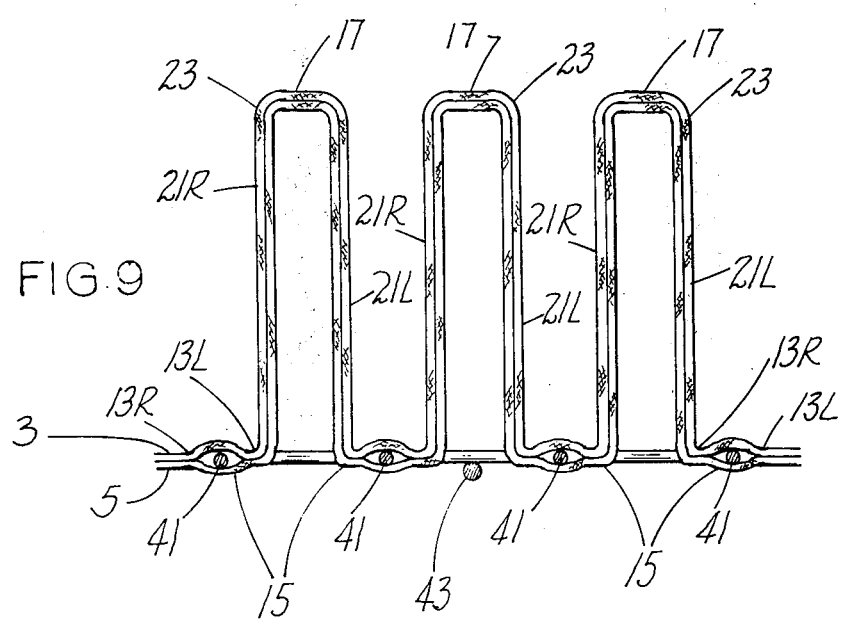
FIG. 9 is a horizontal section on line 9—9 of FIG. 8.

The tape as above described is adapted to be stitched to a drape at the top of the drape on the face of the drape which constitutes its inside face, and pleated and provided with drapery hooks as illustrated in FIGS. 7–9 in accordance with usual drapery pleating practice. Thus, FIGS. 7–9 show the tape formed with three pleates each designated 23 by folding the tape on lines 17 of three successive sections 19 of the tape, with the panels 21L and 21R of each of these three sections disposed side-by-side generally in face-to-face relation integrally joined at the respective line of fold 17 at the front edge of the respective pleat. Pockets 15 are disposed at right angles to the pleats at the back of the pleats between the center pleat and the two outer pleats of the set of three pleats and outward of the two outer pleats, the panels of the pleats being folded forward from the pockets on the lines 13L and 13R. To hold the tape pleated, pins 41 of a drapery hook 43 are inserted in the pockets 15. The hook has four pins 41 for the four pockets for the three pleats. While the pleats are shown spread open in FIGS. 7–9 for better illustrating detail, it will be understood that they would normally be closer together than shown and, usually, in side-by-side contact. For the FIGS. 7–9 illustration, the pins of the drapery hook have been shown more widely spaced than conventional.

The vertical lines of seal at 13L, 13R and 17 form vertical lines of fold for easy and accurate folding of the tape for forming sharp and evenly folded pleats, and the horizontal lines of seal at 25 and 27 stiffen the panels 21L and 21R, whereby the pleats are stiffened at nonfolding regions and maintain their sharpness.

While each of the lines of seal at 13L, 13R, 17, 25 and 27 is shown as a series of discrete fused stitches, it is contemplated that these lines may be continuous uninterrupted lines of seal as indicated at 13L, 13R, 17L, 25L and 27L in FIG. 12, made utilizing a wheel having continuous lines instead of teeth at 13T, 17T, 25T and 27T. Lines of seal 29 are omitted.

While the sections 19 of the tape are shown as being of the same width, for forming all three pleats of each set of the same width, it will be understood some may be of one width and others of another for achieving a predetermined spacing of the sets of three pleats, and/or for forming pleats of different widths within a set. Thus, for example, every fourth section 19 may be a wide section, the three narrow sections between successive wide sections being utilized to form a set of pleats whereby the sets are spaced the width of the wide sections. Or the central section of a set of three sections may be wider than the other two whereby the center pleat of a set of pleats is wider than the other two.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A drapery pleating tape comprising two layers of thermoplastic fabric joined along one longitudinal edge of the tape, said layers being thermoplastically sealed together at intervals spaced longitudinally of the tape on pairs of lines of seal extending transversely of the tape, the two lines of seal of each said pair being spaced one from the other longitudinally of the tape but being closely adjacent one another thereby to define therebetween a narrow elongate pocket closed at its end at said one longitudinal edge of the tape and open at its other end adjacent the outer longitudinal edge of the tape for reception of a pin of a drapery hook, one of said lines of seal of each pair constituting a left side seal and the other a right side seal for the respective pocket, said layers also being thermoplastically sealed together at intervals spaced longitudinally of the tape on lines of seal extending transversely of the tape in each section of the tape intermediate successive pockets, each of said intermediate lines of seal being located generally midway between the right side seal of the pocket at the left thereof and the left side seal of the pocket at the right thereof and dividing the respective section of the tape into two panels, said left and right side pocket seals and said intermediate seals forming lines of fold for pleating the tape with the said two panels of each said section of the tape forming a pleat, said layers further being thermoplastically sealed together on a line of seal extending longitudinally of the tape adjacent said one longitudinal edge of the tape, said line of seal having portions extending between the right side seal of the pocket at the left of each section and the left side seal of the pocket at the right of the section and pocket end portions between the left and right side seals of the pockets, and said layers further being thermoplastically sealed together on a line of seal adjacent the other longitudinal edge of the tape interrupted at the pockets and forming lines of seal extending longitudinally of the tape on each section of the tape between the right side seal of the pocket at the left of said section and the left side seal of the pocket at the right of said section, said intermediate lines of seal extending from one of said longitudinal lines of seal to the other, said longitudinal lines of seal forming stiffening means for said panels.

2. The method of making drapery pleating tape comprising feeding forward two layers of flexible ultrasonically sealable fabric one on the other, and as the layers are fed forward, ultrasonically sealing the layers at intervals spaced longitudinally of the tape on pairs of lines of seal extending transversely of the tape, the two lines of each said pair being spaced one from the other longitudinally of the tape but being closely adjacent one another thereby to define therebetween a narrow elongate pocket closed at its end at said one longitudinal edge of the tape and open at its other end adjacent the other longitudinal edge of the tape for reception of a pin of a drapery hook, one of said lines of seal of each pair constituting a left side seal and the other a right side seal for the respective pocket, ultrasonically sealing the layers together at intervals spaced longitudinally of the tape on lines of seal extending transversely of the tape in each section of the tape intermediate successive pockets, each of said intermediate lines of seal being located generally midway between the right side seal of the pocket at the left thereof and the left side seal of the pocket at the right thereof and dividing the respective section of the tape into two panels, said left and right side pocket seals and said intermediate seals forming lines of fold for pleating the tape with the said two panels of each said section of the tape forming a pleat, ultrasonically sealing said layers together on a line of seal extending longitudinally of the tape adjacent one longitudinal edge of the tape, said line of seal having portions extending between the right side seal of the pocket at the left of each section and the left side seal of the pocket at the right of the section and pocket end portions between the left and right side seals of the pockets, and further ultrasonically sealing said layers together on a line of seal adjacent the other longitudinal edge of the tape interrupted at the pockets and forming lines of seal extending longitudinally of the tape in each section of the tape between the right side seal of the pocket at the left of said section and the left side seal of the pocket at the right of said section, said intermediate lines of seal extending from one of said longitudinal lines of seal to the other, said longitudinal lines of seal forming stiffening means for said panels.

* * * * *